(12) United States Patent
Chrost (10) Patent No.: US 9,853,511 B2
(45) Date of Patent: Dec. 26, 2017

(54) X-RAY TUBE ROTOR WITH CARBON COMPOSITE BASED MATERIAL

(71) Applicant: KONINKLIJKE PHILIPS N.V., Eindhoven (NL)

(72) Inventor: Wolfgang Chrost, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 413 days.

(21) Appl. No.: 14/396,808

(22) PCT Filed: May 9, 2013

(86) PCT No.: PCT/IB2013/053745
§ 371 (c)(1),
(2) Date: Oct. 24, 2014

(87) PCT Pub. No.: WO2013/175335
PCT Pub. Date: Nov. 28, 2013

(65) Prior Publication Data
US 2015/0124937 A1    May 7, 2015

Related U.S. Application Data

(60) Provisional application No. 61/649,984, filed on May 22, 2012.

(51) Int. Cl.
*A61B 6/00* (2006.01)
*H02K 3/02* (2006.01)
*H01J 35/10* (2006.01)

(52) U.S. Cl.
CPC .............. *H02K 3/02* (2013.01); *H01J 35/101* (2013.01); *H01J 35/103* (2013.01); *H01J 2235/1026* (2013.01)

(58) Field of Classification Search
CPC . H01J 2235/1026; H01J 35/101; H01J 35/103
See application file for complete search history.

(56) References Cited

U.S. PATENT DOCUMENTS

| 4,091,301 A |   | 5/1978 | Blank |
| 4,608,707 A | * | 8/1986 | Gabbay ................. H01J 35/103 378/122 |
| 4,862,763 A |   | 9/1989 | Stone, III et al. |

(Continued)

FOREIGN PATENT DOCUMENTS

| DE | 2109159 A1 | 8/1972 |
| DE | 102008025702 A1 | 12/2009 |

(Continued)

*Primary Examiner* — Dani Fox (57) ABSTRACT

The present invention relates to a rotor for an X-ray tube. In order to provide further possibilities for weight reduction in X-ray tubes for providing an increase of rotation frequency, a rotor (10) for an X-ray tube is provided, comprising a rotational structure (12) with a plurality of electrically conducting elements (14), the ends thereof connected to each other and provided such that an external stator magnetic field generated by a stator induces a current in the electrically conducting elements, which current generates a rotor magnetic field to interact with the stator magnetic field. At least the plurality of electrically conducting elements is made from carbon composite based material.

9 Claims, 7 Drawing Sheets

(56) References Cited

U.S. PATENT DOCUMENTS

| | | | |
|---|---|---|---|
| 5,446,778 | A | 8/1995 | Schmidt |
| 5,875,228 | A | 2/1999 | Truszkowska |
| 5,993,280 | A | 11/1999 | Rodhammer et al. |
| 6,940,946 | B2 | 9/2005 | Kutschera |
| 8,073,098 | B2 | 12/2011 | Holzermer et al. |
| 2005/0218741 | A1 | 10/2005 | Wnorowski, Jr. et al. |
| 2006/0018433 | A1 | 1/2006 | Wang |
| 2011/0129068 | A1 | 6/2011 | Lewalter et al. |
| 2011/0163627 | A1 | 7/2011 | Wang |
| 2012/0099703 | A1 | 4/2012 | Kraft |
| 2013/0181570 | A1 | 7/2013 | Iizuka et al. |

FOREIGN PATENT DOCUMENTS

| | | |
|---|---|---|
| EP | 0913854 B1 | 5/1999 |
| EP | 1275118 A1 | 1/2003 |
| FR | 2126517 A6 | 10/1972 |
| JP | 2006100032 A | 4/2006 |
| WO | 9822736 A1 | 5/1998 |
| WO | 0175902 A1 | 10/2001 |
| WO | 2010070574 A1 | 6/2010 |
| WO | 2011148978 A1 | 12/2011 |

\* cited by examiner

X-RAY TUBE ROTOR WITH CARBON COMPOSITE BASED MATERIAL

CROSS-REFERENCE TO PRIOR APPLICATIONS

This application is the U.S. National Phase application under 35 U.S.C. §371 of International Application Serial No. PCT/IB2013/053745, filed on May 9, 2013, which claims the benefit of U.S. application Ser. No. 61/649,984, filed on May 22, 2012. These applications are hereby incorporated by reference herein.

FIELD OF THE INVENTION

The present invention relates to a rotor for an X-ray tube, to an X-ray tube, to an X-ray imaging system, to a method for rotating an anode of an X-ray tube and to a computer program element as well as to a computer readable medium.

BACKGROUND OF THE INVENTION

For driving a rotatable anode of an X-ray tube, a stator is provided which induces a voltage into a rotor coupled to the anode. Upon inducing a voltage into the rotor, for example made out of copper, a magnetic field is generated which interacts with the magnetic field of the stator. However, it has been shown that the thermal mechanical properties of copper also provide a limitation to a lower rotation frequency range. Further, due to increased demands for the field of computer tomography, for example for providing higher scanning frequencies, also weight reduction of the X-ray tube has become increasingly important. The anode disc may thus be provided at least partially with lightweight material such as fibre reinforced ceramic material, as described, for example, in US 2011/0129068 A1.

SUMMARY OF THE INVENTION

Thus, there is a need to provide further possibilities for weight reduction in X-ray tubes for providing an increase of rotation frequency.

The object of the present invention is solved by the subject-matter of the independent claims, wherein further embodiments are incorporated in the dependent claims.

It should be noted that the following described aspects of the invention apply also for the rotor, the X-ray tube, the X-ray imaging system, the method and the computer program element as well as the computer readable medium.

According to a first aspect of the present invention, a rotor for an X-ray tube is provided, comprising a rotational structure with a plurality of electrically conducting elements, the ends thereof connected to each other and provided such that an external stator magnetic field generated by a stator induces a current in the electrically conducting elements, which current generates a rotor magnetic field to interact with the stator magnetic field. At least the plurality of electrically conducting elements is made from carbon composite based material.

Carbon composite based material is also referred to as C/C-based material. The magnetic properties of C/C-based material are similar to these of copper; regarding the electrical properties, there is a huge dependency on the used type of fibre. For example, the carbon-fibres may be provided as HM-fibres, i.e. as high modulus carbon-fibres, i.e. carbon-fibres with a higher degree of conductivity stiffness. For example, the HM-fibres have a typical electrical resistance of $1,6 \cdot 10^{-6}$ Ohm m HM-fibres processed at high temperatures have similar electrical properties as copper. However, at higher temperatures, their electrical properties are even better than those of copper, which decrease with increasing temperature.

For example, the electrically conducting elements are made from copper-free material. As another example, the electrically conducting elements are made from metal-free material.

According to an exemplary embodiment, the carbon composite based material comprises carbon-fibre reinforced carbon. The carbon-fibres are oriented in a way that high modulus fibres optimize the induced current flow whereas high tensile fibres provide the required strength.

For example, the carbon-fibres are provided as primary fibre winding oriented such that the current can be induced in the electrically conducting elements. The primary windings may comprise HM-fibres.

High tensile fibres are also referred to as HT-fibres, with, for example, a value of app. 230 GPa.

For example, the carbon-fibres are also provided as secondary fibre winding oriented in direction of tensile load bearing. The secondary windings may comprise HT-fibres. The secondary fibre winding is arranged for mechanical support.

The primary winding may be oriented in axial and tangential direction, which also comprises an orientation parallel or inclined to the axis of rotation.

The carbon-fibre reinforced carbon is also referred to as CFC.

According to an exemplary embodiment, the rotational structure is a cylindrical structure arranged around a rotor shaft, to which shaft an anode can be mounted.

According to a further example, the rotational structure is provided as a cylindrical collar on an anode disc on a side opposite a side where a focal track is provided.

The primary winding may be oriented in axial direction, which also comprises the above mentioned orientation parallel or inclined to the axis of rotation.

In another example, the rotational structure is provided as a rotor disc arranged with a distance to the anode disc. The rotor disc is provided on the side opposite of the focal track side (underneath the anode disc).

According to a further exemplary embodiment, the rotational structure is provided integrally with an anode disc structure. The anode disc is made at least partially from carbon-fibre reinforced carbon. The anode disc comprises a primary winding structure such that the rotor magnetic field can be generated by the stator magnetic field.

The primary winding is oriented in radial and tangential direction to the axis of rotation.

According to a further example, the rotational structure is provided in a stepped protrusion of the anode disc on a side opposite the side of the focal track. The stepped protrusion is provided with an edge such that the stator can interact on the edge.

According to a second aspect of the present invention, an X-ray tube is provided comprising a rotatable anode arrangement, a bearing arrangement, a stator, and a rotor. The rotatable anode arrangement is supported by the bearing arrangement. The rotor is provided as a rotor for an X-ray tube according to one of the above mentioned examples. The stator is provided with electrical coils to generate a stator magnetic field to interact with the rotor such that electrical current is generated in the rotor generating the rotor magnetic field for rotating the anode arrangement.

As an example, the rotatable anode arrangement is provided as an anode disc. The bearing arrangement may be supported by the stator. A housing structure may be provided enclosing a vacuum tube volume, inside which the anode arrangement, the bearing arrangement, the stator, and the rotor are provided, and inside which a vacuum for generating X-rays is provided. The stator and/or the bearing arrangement are connected to the housing.

According to an exemplary embodiment, the stator comprises a number of C-shaped iron cores around which a winding is provided. The rotational structure is arranged partly between the ends of the C-shaped iron cores.

The partially enclosing provides a closing of the stator magnetic field generated by the stator.

In case of a rotational structure provided integrally with the anode disc structure, the stator may be provided along the edge of the anode disc structure.

According to a further exemplary embodiment, the stator is segmented comprising a plurality of C-shaped iron cores around which a winding is provided. The rotational structure is arranged partly between the ends of the C-shaped iron cores. The C-shaped iron cores of the stator are arranged with at least one gap such that a focal spot is provided on the anode disc structure, upon which focal spot an electron beam can impinge.

According to a third aspect of the present invention, an X-ray imaging system is provided, comprising an X-ray source, an X-ray detector and a processing unit. The X-ray source is provided as an X-ray tube according to the preceding examples. The processing unit is provided to control the rotation by the rotor.

According to a fourth aspect of the present invention, a method for rotating an anode of an X-ray tube is provided, comprising the following steps:
a) applying a first electrical current to a stator winding;
b) generating a stator magnetic field;
c) acting of the stator magnetic field on the rotor, wherein the rotor comprises a rotational structure with a plurality of electrically conducting elements made from carbon composite based material, the ends thereof connected to each other;
d) inducing a second current in the electrically conducting elements by the stator magnetic field, thereby generating a rotor magnetic field;
e) interacting of the rotor magnetic field with the stator magnetic field; and
f) driving the anode to rotation due to the interaction.

According to an aspect of the present invention, at least a part of the copper, usually applied, of an X-ray tube motor is replaced by specially designed C/C-based material. This leads to a motor with the same efficiency, but suitable for much higher rotation frequencies, and also with reduced weight. For example, the integration of a C/C-based rotational structure into the anode disc provides compact X-ray tube architecture. In such case, a segmented stator may be placed around the rotational structure and to realize the closing of the magnetic field.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 1 shows an exemplary embodiment of a rotor for an X-ray tube in a side view in FIG. 1A and in a cross-section in FIG. 1B;

DETAILED DESCRIPTION OF EMBODIMENTS

Figure 1A:
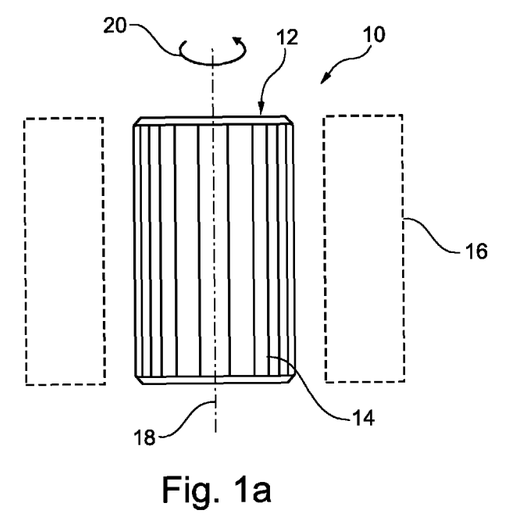
Figure 1B:
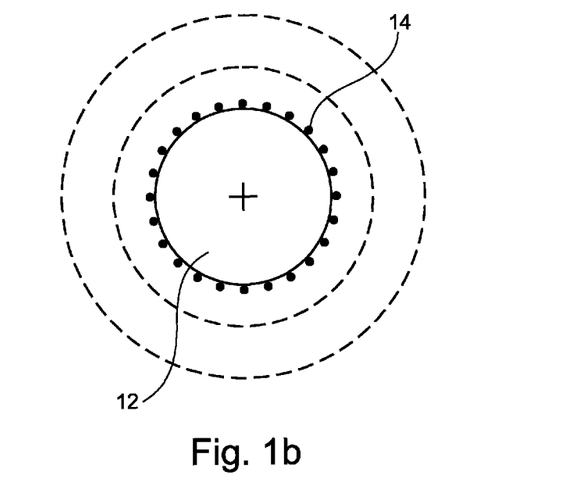

FIG. 1A shows a side view of a rotor 10 for an X-ray tube. The rotor 10 comprises a rotational structure 12 with a plurality of electrically conducting elements, the ends thereof connected to each other and provided such that an external stator magnetic field generated by a stator induces a current in the electrically conducting elements 14, which current generates a rotor magnetic field to interact with a stator magnetic field. This can also be seen from FIG. 1B showing a top view. The stator is indicated with dotted lines 16 in FIGS. 1A and 1B. At least the plurality of electrically conducting elements 14 is made from carbon composite based material.

Further, an axis of rotation 18 is indicated together with a rotational arrow 20 indicating the direction of rotation.

It is noted that the electrically conducting elements 14 are indicated with lines parallel to the axis of rotation, whereas, according to the present invention, also lines inclined to the axis of rotation may be provided.

The carbon composite based material may comprise carbon-fibre reinforced carbon. The carbon-fibres are oriented in a way that high modulus fibres optimize the induced current flow whereas high tensile fibres provide the required strength.

The carbon-fibres may be provided as primary fibre winding oriented such that the current can be induced in the electrically conducting elements.

Figure 2:
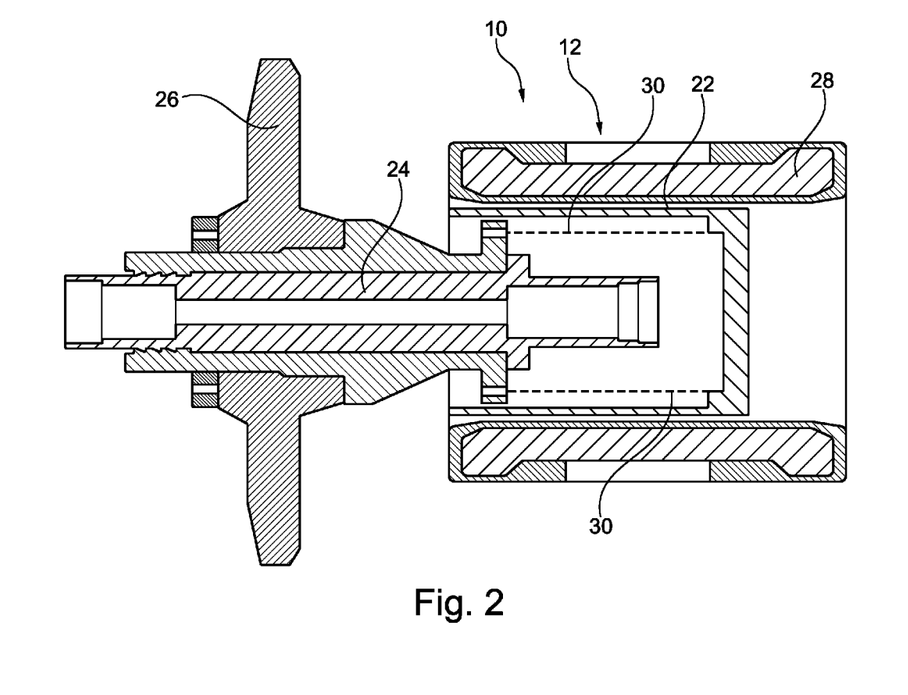
FIG. 2 shows a further example of a rotor for an X-ray tube in a longitudinal cross-section.

As can be seen in FIG. 2 in a cross-section along the longitudinal axis, i. e. the axis of rotation, the rotational structure 12 can be provided as a cylindrical structure 22 arranged around a rotor shaft 24 to which shaft an anode 26 can be mounted. Further, in addition, also a stator 28 is indicated surrounding the cylindrical structure 22. An inner concentric cylindrical structure 30 will provide a closing for the magnetic field.

The shaft is rotatably supportable by bearings, which is not further shown. The rotor is a counterpart to a stator, for example the stator 28, for driving the rotatable anode 26.

For example, at least the circumferential of the rotational structure, for example a cylindrical structure 22, is made from copper-free material. The circumferential part can be made from carbon based material. For example, the circumferential part is made from copper-free material, for example from metal-free material.

As secondary fibre (not further shown) winding may be arranged for mechanical support of the cylindrical structure.

Figure 3:
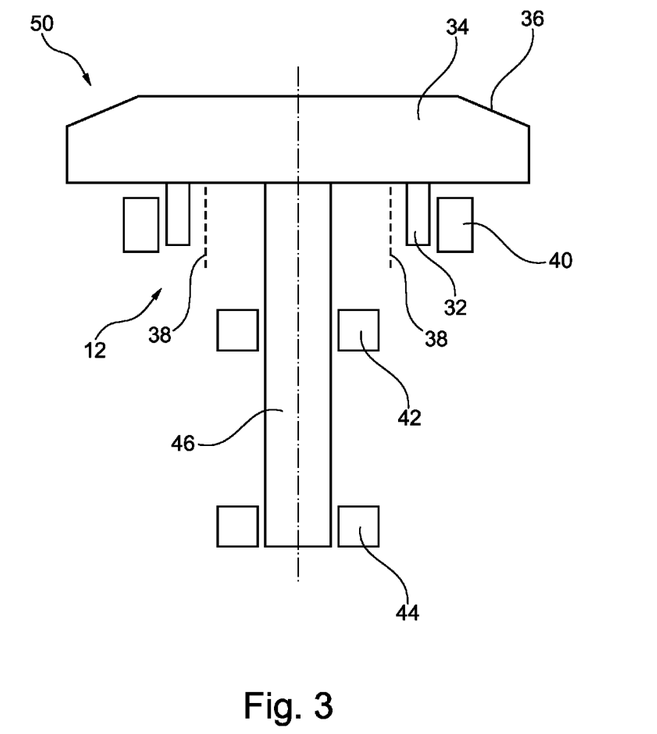
FIG. 3 shows a further example of a rotor in a cross-section.

According to the example shown in FIG. 3, the rotational structure 12 is provided as a cylindrical collar 32 on an anode disc 34 on a side opposite a side where a focal track 36 is provided. A dotted line 38 indicates the provision of a closing of the magnetic field. Further, a stator 40 is also schematically indicated, as well as a bearing arrangement 42, 44, at least partially surrounding an anode shaft 46. According to a further example, shown in FIG. 4, the rotational structure 12 is provided integrally with an anode disc structure 48.

Figure 4:
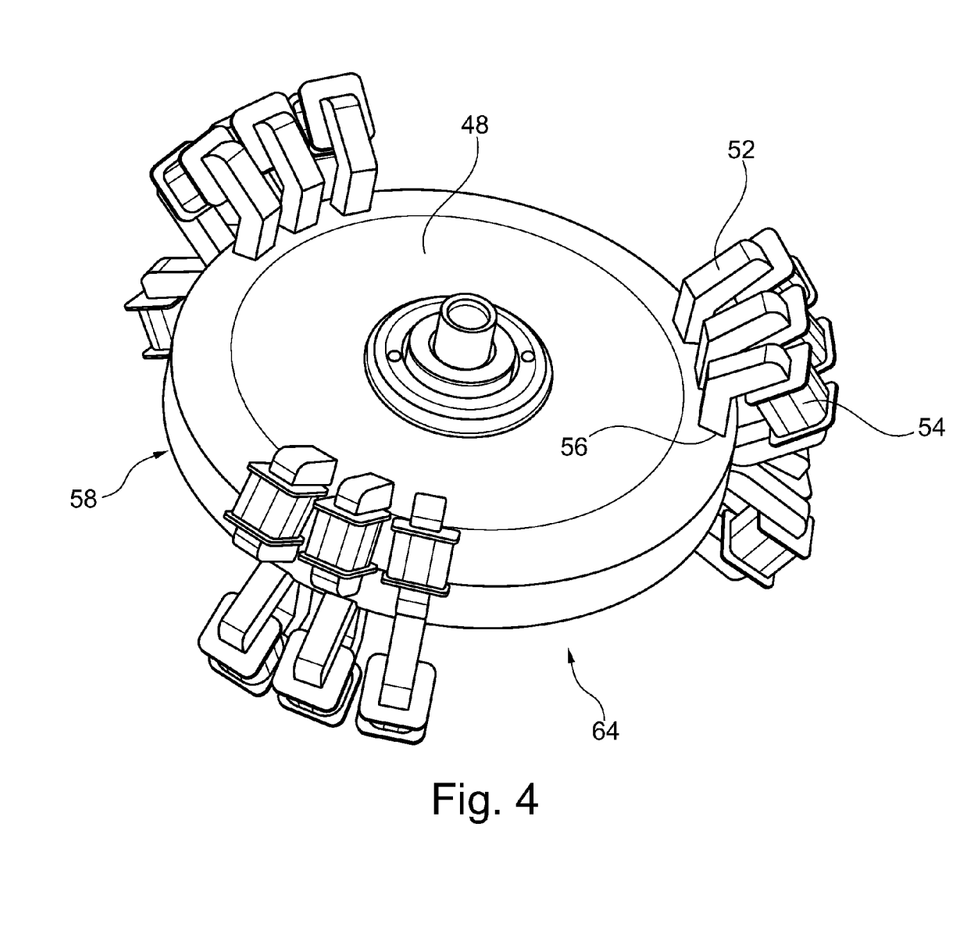
FIG. 4 shows an example for an X-ray tube in a perspective top view.

The anode disc is made at least partially from carbon-fibre reinforced carbon, and the anode disc 48 comprises a primary winding structure such that the rotor magnetic field can be generated by the stator magnetic field. The primary winding is oriented in radial and tangential direction to the axis of rotation.

For a better understanding, FIG. 4 also shows further parts belonging to an example of an X-ray tube 50, comprising the rotatable anode arrangement, such as the anode disc 26 in FIG. 2 or the anode 34 shown in FIG. 3 or the anode 48 shown in FIG. 4, as well as a bearing arrangement with bearing such as the bearings 42, 44 in FIG. 3 and a stator, for example the stator 40 in FIG. 3 and a rotor 10, as discussed in examples above. The rotatable anode arrangement is supported by the bearing arrangement and the rotor is provided as a rotor for an X-ray tube according to one of the above mentioned examples. The stator is provided with electrical coils to generate a stator magnetic field to interact with the rotor such that electrical current is generated in the rotor generating the rotor magnetic field for rotating the anode arrangement.

According to a further example, the rotatable anode arrangement is provided as an anode disc. The bearing arrangement is supported by the stator. Further, a housing may be provided enclosing a tube volume (not further shown), inside which the anode arrangement, the bearing arrangement, the stator, and the rotor are provided, and inside which a vacuum for generating X-rays is provided. The stator and/or the bearing arrangement are connected to the housing according to a further example.

As indicated in FIG. 4, the stator may comprise a number of C-shaped iron cores 52 around which a winding 54 is provided. The rotor is arranged partly between ends 56 of the C-shaped iron cores 52.

Figure 5:
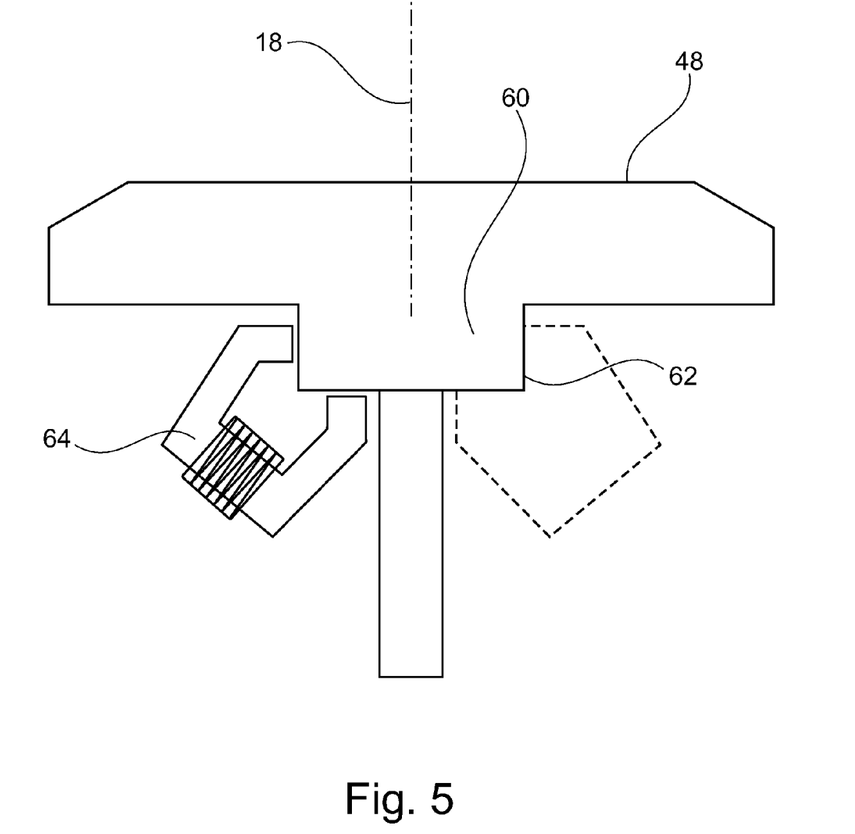
FIG. 5 shows a further example of a rotor in a cross-section.

For example, as shown in FIG. 4, the rotor 10 and its rotational structure 12 are provided integrally with the anode disc structure, such as the disc 48 in FIG. 4. The stator is provided along an edge 58 of the anode disc structure. As indicated in FIG. 5, the rotor may be provided as a stepped protrusion 60 of the anode disc 48 on a side opposite the side of the focal track. The stepped protrusion 60 is provided with an edge 62 such that a stator can interact on the edge 62. For example, as a stator, a number of C-shaped iron cores 64 is provided, around which iron cores a winding is provided.

A further aspect is also shown in FIG. 4: The stator 40 may be provided segmented comprising a plurality of stator elements, such as C-shaped iron cores 52, around which a winding 54 is provided. The rotor is arranged partly between the ends of the C-shaped iron cores, and the C-shaped iron cores of the stator are arranged with at least one gap 64 such that a focal spot is provided on the anode disc structure, upon which focal spot an electron beam can impinge.

The segmented stator is also provided to the other examples. However, the segmented stator is only necessary if the stator is arranged such that a focal track is covered by the stator elements. Depending on the location of the focal track, the example of FIG. 4, for example, may also be provided as a continuous stator without gaps in between. Of course, a different number of gaps may be provided, for example for a different segmentation.

The arrangement of the rotor, i. e. the anode, between the ends of the C is provided for closing of the stator magnetic field generated by the stator. The C-shaped iron cores can be provided in at least two groups, each group comprising a number of C-shaped iron cores. FIG. 4 shows, as an example, three groups of three C-shaped iron cores each.

Each group of the stator comprises at least one pair of C-shaped iron cores with a winding with an upper C-shaped core having the upper outer edge of the anode arranged between the ends of the C, and a lower C-shaped core having the lower outer edge of the anode arranged between the ends of the C.

Figure 6:
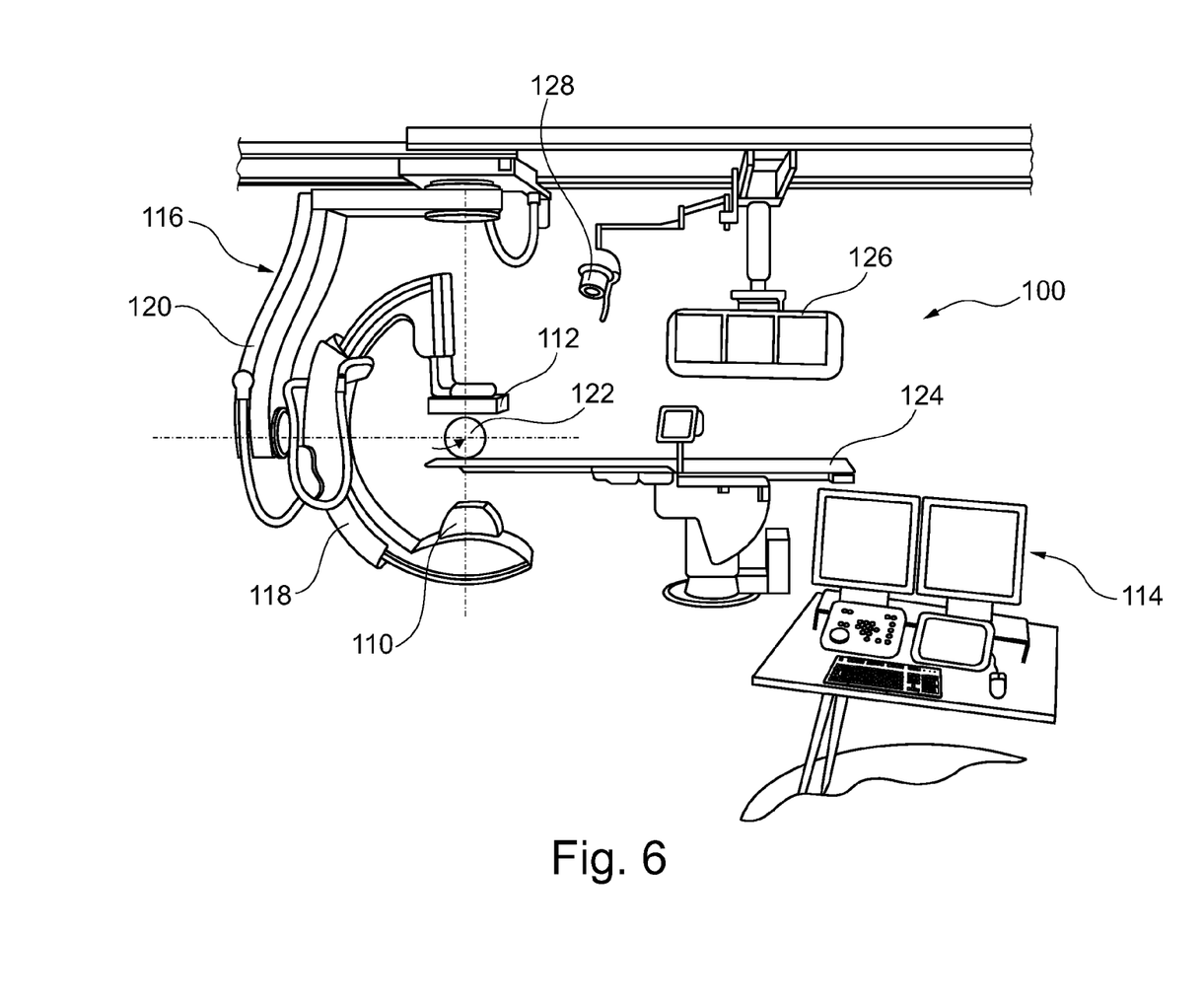
FIG. 6 shows an example of an X-ray imaging system.

It must be noted that the term "upper" relates to the side of the anode, on which the X-ray radiation is generated, and "lower" relates to the opposite side, independent of the actual arrangement of the tube in space. FIG. 6 shows an X-ray imaging system 100 comprising an X-ray source 110, an X-ray detector 112, and a processing unit 114. The X-ray source 110 is provided as an X-ray tube according to the above-mentioned examples. The processing unit 14 is provided to control the rotation by the rotor.

For example, the X-ray imaging system 100 is provided as a so-called C-arm structure 116 with a C-arm 118, to which the X-ray source and the X-ray detector are mounted to the ends of the C. Further, a movable support structure 120 is provided for allowing a free movement around an object 122, arranged on a patient table 124. Further, display arrangements 126 are provided, in addition to a lighting 128.

Figure 7:
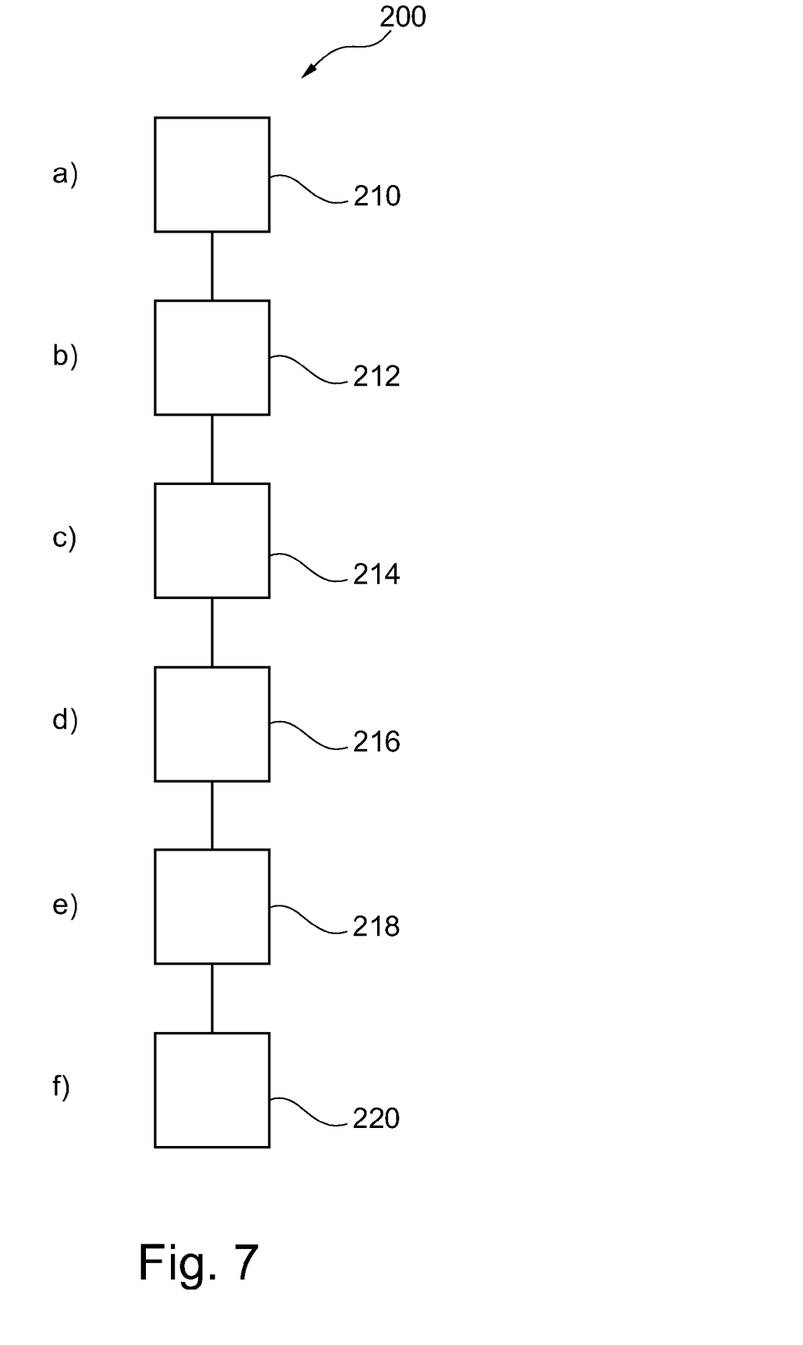
FIG. 7 shows basic steps of an example of method.

FIG. 7 shows a method 200 for rotating an anode of an X-ray tube, comprising the following steps: In a first step 210, a first electrical current is applied to a stator winding. In a second step 212 a stator magnetic field is generated. In a third step 214, the stator magnetic field is acting on the rotor, wherein the rotor comprises a rotational structure with a plurality of electrically conducting elements made from carbon composite based material, the ends thereof connected to each other. In a fourth step 216, a second current is induced in the electrically conducting elements by the stator magnetic field, thereby generating a rotor magnetic field. In a fifth step 218, the rotor magnetic field is interacting with the stator magnetic field. In a sixth step 220, the anode is driven to rotation due to the interaction.

The first step 210 is also referred to as step a), the second step 212 as step b), the third step 214 as step c), the fourth step 216 as step d), the fifth step 218 as step e), and the sixth step 220 as step f).

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A rotor for an X-ray tube, comprising:
a rotational structure with a plurality of electrically conducting elements, ends of the electrically conducting elements being connected to each other and provided such that an external stator magnetic field generated by a stator induces a current in the electrically conducting elements, which current generates a rotor magnetic field to interact with the stator magnetic field;
wherein at least the plurality of electrically conducting elements is made from carbon composite based material; and
wherein the rotational structure is provided as a cylindrical collar on an anode disc on a side opposite a side where a focal track is provided.

2. The rotor according to claim 1, wherein the carbon composite based material comprises carbon-fibre reinforced carbon; and
wherein the carbon-fibres are oriented in a way that high modulus fibres optimize the induced current flow whereas high tensile fibres provide the required strength.

3. An X-ray system, comprising:
a rotatable anode arrangement;
a bearing arrangement;
a stator; and
a rotor comprising a rotational structure with electrically conducting elements, end of the electrically conducting elements being connected to each other and provided such that an external stator magnetic field generated by the stator induces a current in the electrically conducting elements, which current generates a rotor magnetic field to interact with a stator magnetic field, wherein at least the electrically conducting elements are made from carbon composite based material, and wherein the rotational structure is provided as a cylindrical collar on an anode disc on a side opposite a side where a focal track is provided;
wherein the rotatable anode arrangement is supported by the bearing arrangement; and
wherein the stator is provided with electrical coils to generate the stator magnetic field to interact with the rotor such that electrical current is generated in the rotor generating the rotor magnetic field for rotating the anode arrangement.

4. The X-ray system according to claim 3,
wherein the stator is provided at least partially enclosing the cylindrical collar.

5. The X-ray system according to claim 3, wherein the stator comprises a number of C-shaped iron cores, around which a winding is provided; and
wherein the rotational structure is arranged partly between ends of the C-shaped iron cores.

6. The X-ray system according to claim 3, wherein the rotational structure is provided integrally with the anode disc; and
wherein the stator is provided along an edge of the anode disc structure.

7. The X-ray system according to claim 5, wherein the stator is segmented; and
wherein the C-shaped iron cores of the stator are arranged with at least one gap such that a focal spot is provided on the anode disc, upon which focal spot an electron beam can impinge.

8. The X-ray system according to claim 3, further comprising:
an X-ray source;
an X-ray detector;
a processing unit; and
an X-ray tube comprising the rotatable anode arrangement, the bearing arrangement, the stator and the rotor according to claim 3,
wherein the processing unit is provided to control rotation by the rotor.

9. A method for rotating an anode of an X-ray tube, the method comprising:
a) applying a first electrical current to a stator winding;
b) generating a stator magnetic field;

c) acting of the stator magnetic field on a rotor, wherein the rotor comprises a rotational structure with a plurality of electrically conducting elements made from carbon composite based material, ends thereof connected to each other; wherein
the rotational structure is provided as a cylindrical collar on an anode disc on a side opposite a side where a focal track is provided;
d) inducing a second current in the electrically conducting elements by the stator magnetic field, thereby generating a rotor magnetic field;
e) interacting of the rotor magnetic field with the stator magnetic field; and
f) driving the anode to rotation due to the interaction.

\* \* \* \* \*